(12) United States Patent
Agrawal et al.

(10) Patent No.: US 10,484,201 B2
(45) Date of Patent: Nov. 19, 2019

(54) DISTRIBUTED PLATFORM FOR ROBUST EXECUTION OF SMART HOME APPLICATIONS

(71) Applicant: Samsung Electronics Co., Ltd., Suwon-si, Gyeonggi-do (KR)

(72) Inventors: Nitin Agrawal, Mountain View, CA (US); Masoud Saeida Ardekani, Mountain View, CA (US); Rayman Preet Singh, Mountain View, CA (US); Riza Suminto, Mountain View, CA (US); Douglas B. Terry, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/418,219

(22) Filed: Jan. 27, 2017

(65) Prior Publication Data

US 2018/0091331 A1 Mar. 29, 2018

Related U.S. Application Data

(60) Provisional application No. 62/400,959, filed on Sep. 28, 2016.

(51) Int. Cl.
| | | |
|---|---|---|
| H04L 29/14 | (2006.01) |
| H04L 29/08 | (2006.01) |
| H04L 12/28 | (2006.01) |
| H04L 12/437 | (2006.01) |
| H04L 12/26 | (2006.01) |
| H04L 12/24 | (2006.01) |

(52) U.S. Cl.
CPC ........ *H04L 12/437* (2013.01); *H04L 12/2803* (2013.01); *H04L 41/06* (2013.01); *H04L 41/12* (2013.01); *H04L 43/04* (2013.01); *H04L 43/0817* (2013.01); *H04L 67/10* (2013.01); *H04L 67/12* (2013.01); *H04L 69/40* (2013.01)

(58) Field of Classification Search
CPC .......................... H04W 4/008; H04W 52/0209
USPC ........... 370/252–486; 455/410, 517; 709/321
See application file for complete search history.

(56) References Cited

U.S. PATENT DOCUMENTS

| | | |
|---|---|---|
| 8,761,946 B2 | 6/2014 | Matsuoka et al. |
| 9,213,903 B1 | 12/2015 | Laska et al. |
| 9,353,965 B1 | 5/2016 | Goyal et al. |
| 9,412,258 B2 | 8/2016 | Matsuoka et al. |
| 9,413,613 B2 | 8/2016 | Turon et al. |

(Continued)

FOREIGN PATENT DOCUMENTS

WO    2015-031750    3/2015

OTHER PUBLICATIONS

International Search Report from International Application No. PCT/KR2017/010869 dated Jan. 11, 2018.

(Continued)

*Primary Examiner* — Iqbal Zaidi

(57) ABSTRACT

An event is received at a computing device from a sensor, the computing device is one of a number of computing devices in a logical topology of a distributed network. Next, it is determined a gap, gapless, or gapless-state delivery protocol. The event is delivered from the computing device to one of the computing devices using the determined delivery protocol, thereby causing processing of the event and producing an output in the distributed network.

20 Claims, 12 Drawing Sheets

(56) References Cited

U.S. PATENT DOCUMENTS

| | | | |
|---|---|---|---|
| 9,452,685 | B2 | 9/2016 | Hyde et al. |
| 9,456,297 | B2 | 9/2016 | Pi-Sunyer |
| 9,456,349 | B2 | 9/2016 | Kim et al. |
| 9,459,018 | B2 | 10/2016 | Fadell et al. |
| 9,459,728 | B2 | 10/2016 | Vartanian et al. |
| 9,460,600 | B2 | 10/2016 | Boehm et al. |
| 9,462,041 | B1 | 10/2016 | Hagins et al. |
| 9,462,108 | B2 | 10/2016 | Ko et al. |
| 9,462,210 | B2 | 10/2016 | Dagit, III |
| 9,462,415 | B2 | 10/2016 | Jung et al. |
| 9,682,638 | B1 * | 6/2017 | McCurdy .............. B60N 2/002 |
| 2008/0242314 | A1 | 10/2008 | McFarland |
| 2014/0129734 | A1 | 5/2014 | Vasseur et al. |
| 2014/0301362 | A1 * | 10/2014 | Koskinen .............. H04L 1/1838 370/331 |
| 2015/0372999 | A1 | 12/2015 | Pi-Sunyer |
| 2016/0094398 | A1 | 3/2016 | Choudhury et al. |
| 2016/0134932 | A1 | 5/2016 | Karp et al. |
| 2016/0171153 | A1 * | 6/2016 | Van Rooyen .... H03K 19/17736 702/20 |
| 2016/0212582 | A1 | 7/2016 | Jin et al. |
| 2016/0261458 | A1 | 9/2016 | Huang |
| 2016/0283795 | A1 | 9/2016 | Laska et al. |

OTHER PUBLICATIONS

Written Opinion from International Application No. PCT/KR2017/010869 dated Jan. 11, 2018.
Aeotec Z-Wave Home Sensors. http://aeotec.com/homeautomation.
Amazon Home Automation Store, http://www.amazon.com/home-automation-smarthome/b?ie= UTF8&node=6563140011.
Amazon AWS IoT. https://aws.amazon.com/iot/.
Azure IoT Suite. https://azure.microsoft.com/en-us/suites/iot-suite/.
Bluetooth Low Energy. https://www.bluetooth.com.
EmberZNet PRO ZigBee Protocol Stack Software, https://www.silabs.com/products/wireless/mesh-networking/zigbee/Pages/emberznet- pro-zigbee- protocol-stack-software.aspx.
Apache Flink. https://flink.apache.org/.
Foscam IP Camera. http://foscam.us/.
HomeKit. https://developer.apple.com/homekit/.
The Internet of Things. http://share.cisco.com/internet-of-things.html/.
Nest Protect. https://nest.com/smoke-co-alarm/meet-nest-protect.
The Netty Project. http://netty.io/.
Google enters the Wi-Fi router market with the very different OnHub. http://www.techhive.com/article/2972681/home-networking/google- enters-the-wi-fi-router-market-with-the-very-different- onhub.html.
OpenZWave. https://github.com/openzwave/.
Samsung Smart TVs Will Be Connected With the Smart-Things Platform. http://blog.smartthings.com/ news/smartthings- updates/samsung-tvs-will-be-connected-with-the-smartthings-platform/.
SmartThings, http://www.smartthings.com/.
SmartThings Officially Published Apps. https://community.smartthings.com/t/list-of-all- officially-published-apps-from-the-more- category-of-smart-setup-in-the-mobile-app.
SmartThings Home Flood App. https://blog.smartthings.com/how-to/how-to-prevent- a-leak-from-causing-a-flood/.
Vera Smarter Home Control. http://getvera.com/.
IBM Watson IoT. http://www.ibm.com/internet-of- things/.
Wink Connected Home Hub. http://www.wink.com/.
ZigBee Alliance. http://www.zigbee.org/.
Z-Wave Alliance. http://www.z-wavealliance.org.
The US Market for Home Automation and Security Technologies. Technical report, BCC Research, IAS031B, 2011.
T. Akidau, A. Balikov, K. Bekiroglu, S. Chernyak, J. Haberman, R. Lax, S. McVeety, D. Mills, P. Nordstrom, and S. Whittle. Millwheel: "Fault-Tolerant Stream Processing At Internet Scale" In Proc. VLDB Endow., pp. 734-746, 2013.
M. Balazinska, H. Balakrishnan, S. R. Madden, and M. Stonebraker. "Fault-Tolerance in the Borealis Distributed Stream Processing System" In Int. Conf. on the Mgt. of Data (SIGMOD), pp. 13-24, 2008.
R. Boichat and R. Guerraoui. "Reliable And Total Order Broadcast In The Crash-Recovery Model" Journal of Parallel and Dist. Comp., 65(4):397-413, Apr. 2005.
A. J. Brush, J. Jung, R. Mahajan, and F. Martinez. "Digital Neighborhood Watch: Investigating the Sharing of Camera Data Amongst Neighbors." In Conf. on Computer Supported Cooperative Work (CSCW), 2013.
D. Carney, M. Cherniack, C. Convey, S. Lee, G. Seidman, M. Stonebraker, and S. Zdonik. "Monitoring Streams—A New Class of Data Management Applications." In Int. Conf. on Very Large Data Bases (VLDB), pp. 215-226, 2002.
G. J. Chen, J. L. Wiener, S. Iyer, A. Jaiswal, R. Lei, N. Simha, W. Wang, K. Wilfong, T. Williamson, and S. Yilmaz. "Realtime Data Processing At Facebook." In Int. Conf. on the Mgt. of Data (SIGMOD), pp. 1087-1098, 2016.
J. Chen, K. Kwong, D. Chang, J. Luk, and R. Bajcsy. "Wearable Sensors for Reliable Fall Detection." In Engineering in Medicine and Biology Society, IEEE, Engineering in Medicine and Biology $27^{th}$ Annual Conference, pp. 3551-3554, 2005.
P. Chew and K. Marzullo. "Masking Failures of Multidimensional Sensors." In Symp. on Reliable Dist. Sys. (SRDS), pp. 32-41, Sep. 1991.
Chun-Te, Chu, J. Jung, Z. Liu, and R. Mahajan. "sTrack: Secure Tracking in Community Surveillance." Technical report, Microsoft Research, 2014.
C. Dixon, R. Mahajan, S. Agarwal, A. Brush, B. Lee, S. Saroiu, and P. Bahl. "An Operating System For The Home." In Networked Sys. Design and Implem. (NSDI), pp. 337-352, 2012.
H. Durrant-Whyte and T. C. Henderson. "Multisensor Data Fusion", pp. 585-610. 2008.
Peter Xiang Gao and S. Keshav. "Spot: A Smart Personalized Office Thermal Control System". In Int. Conf. on Future energy systems (e-Energy), pp. 237-246. ACM, 2013.
H. Garcia-Molina. "Elections In A Distributed Computing System" IEEE Trans. on Computers, C-31(1):48-59, Jan. 1982.
J. Groopman and S. Etlinger. "Consumer Perceptions Of Privacy In The Internet Of Things" Technical report, 2015.
M. He, Wen-Jen. Cai, and S.-Y. Li. "Multiple Fuzzy Model-Based Temperature Predictive Control for HVAC Systems" Information sciences, 169(1):155-174, 2005, downloaded Dec. 15, 2016.
T. W. Hnat, V. Srinivasan, J. Lu, T. I. Sookoor, R. Dawson, J. Stankovic, and K. Whitehouse."The Hitchhiker's Guide to Successful Residential Sensing Deployments" In Conf. on Embedded Networked Sensor Sys. (SenSys), pp. 232-245, 2011.
J. H. Hwang, M. Balazinska, A. Rasin, U. çetintemel, M. Stonebraker, and S. Zdonik. "High-Availability Algorithms For Distributed Stream Processing" In Int. Conf. on Data Engineering (ICDE), pp. 779-790, 2005.
A. D. Joseph, A. F. de Lespinasse, J. A. Tauber, D. K. Gifford, and M. F. Kaashoek. "Rover: A Toolkit For Mobile Information Access" In Operating Systems Review, vol. 29, pp. 156-171, 1995.
Y. Ju, Y. Lee, J. Yu, C. Min, I. Shin, and J. Song. "SymPhoney: A Coordinated Sensing Flow Execution Engine For Concurrent Mobile Sensing Applications" In Conf. on Embedded Networked Sensor Sys. (SenSys), pp. 211-224. ACM, 2012.
P. Kodeswaran, R. Kokku, S. Sen, and M. Srivatsa. "Idea: A System For Efficient Failure Management In Smart IoT Environments" In Int. Conf. on Mobile Sys., Apps. and Services (MobiSys), 2016.
S. Kulkarni, N. Bhagat, M. Fu, V. Kedigehalli, C. Kellogg, S. Mittal, J. M. Patel, K. Ramasamy, and S. Taneja. "Twitter Heron: Stream Processing At Scale" In Int. Conf. on the Mgt. of Data (SIGMOD), pp. 239-250, 2015.
H. Liu, T. Roeder, K. Walsh, R. Barr, and E. G. Sirer. "Design And Implementation Of A Single System Image Operating System for Ad Hoc Networks" In Int. Conf. on Mobile Sys., Apps. and Services (MobiSys), 2005.
A. Martin, T. Smaneoto, T. Dietze, A. Brito, and C. Fetzer. "User-Constraint and Self-Adaptive Fault Tolerance for Event Stream

(56) References Cited

OTHER PUBLICATIONS

Processing Systems" In Int. Conf. on Dependable Sys. and Networks (DSN), pp. 462-473, Jun. 2015.
K. Marzullo. "Tolerating Failures Of Continuous-Valued Sensors" Trans. on Computer Sys., 8(4):284-304, Nov. 1990.
M. Mubashir, L. Shao, and Luke Seed "A Survey On Fall Detection: Principles And Approaches" Neurocomputing, 100:144-152, 2013. Special issue: Behaviours in video, May 7, 2012.
S. Munir and J. A. Stankovic. "Failuresense: Detecting Sensor Failure Using Electrical Appliances In The Home" In Int. Conf. on Mobile Ad Hoc and Sensor Systems (MASS), pp. 73-81, 2014.
E. F. Nakamura, A. A. F. Loureiro, and A. C. Frery. "Information Fusion For Wireless Sensor Networks: Methods, Models, and Classifications" 39(3), Sep. 2007.
M. Piccardi. "Background Subtraction Techniques: A Review" In Int. Conf. on Systems, Man and Cybernetics, vol. 4, pp. 3099-3104, 2004.
J. Scott, A. Brush, J. Krumm, B. Meyers, M. Hazas, S. Hodges, and N. Villar. "PreHeat: Controlling Home Heating Using Occupancy Prediction" In Int Joint Conf. on Pervasive and Ubiquitous Computing (UbiComp), 2011.
M. A. Shah, J. M. Hellerstein, and E. Brewer. "Highly Available, Fault-Tolerant, Parallel Dataflows" In Int. Conf. on the Mgt. of Data (SIGMOD), pp. 827-838, 2004.
C. Shen, R. P. Singh, A. Phanishayee, A. Kansal, and R. Ma-hajan. "Beam: Ending Monolithic Applications For Connected Devices" In Usenix Annual Tech. Conf. (ATC), pp. 143-157, 2016.
R. P. Singh, S. Keshav, and T. Brecht. "A Cloud-based Consumer-centric Architecture for Energy Data Analytics" In Int. Conf. on Future energy systems (e-Energy), pp. 63-74, 2013.
F. Sposaro and G. Tyson. "ifall: An Android Application For Fall Monitoring And Response" In Annual Int. Conf. of the Engineering in Medicine and Biology Society (EMBC), pp. 6119-6122,2009.
I. Stanoi, D. Agrawal, and A. El Abbadi. "Using Broadcast Primitives In Replicated Databases" In Int. Conf. on Distributed Comp. Sys. (ICDCS), pp. 148-155, May 1998.
J. Taneja, A. Krioukov, S. Dawson-Haggerty, and D. Culler. "Enabling Advanced Environmental Conditioning With A Building Application Stack" In Int. Green Computing Conference (IGCC), pp. 1-10, 2013.
A. Tavakoli, A. Kansal, and S. Nath. "On-Line Sensing Task Optimization For Shared Sensors" In Int. Conf. on Information Processing in Sensor Networks (IPSN), pp. 47-57, 2010.
D. B. Terry, M. M. Theimer, K. Petersen, a. J. Demers, M. J. Spreitzer, and C. H. Hauser. "Managing Update Conflicts In Bayou, A Weakly Connected Replicated Storage System" In Symp. on Op. Sys. Principles (SOSP), pp. 172-182, 1995.
A. Toshniwal, S. Taneja, A. Shukla, K. Ramasamy, J. M. Patel, S. Kulkarni, J. Jackson, K. Gade, M. Fu, J. Donham, N. Bhagat, S. Mittal, and D. Ryaboy. "Storm @twitter" In Int. Conf. on the Mgt. of Data (SIGMOD), 2014.
K. Whitehouse, F. Zhao, and J. Liu. "Semantic Streams: A Framework For Composable Semantic Interpretation Of Sensor Data" In W. on Wireless Sensor Networks, pp. 5-20, 2006.
Plunkett et al., "Managing Multiple Wireless Standards for Smart Home Applications," Cadence, 2016.
Shankland, "Your smart home will be a mess," CNET, Jan. 8, 2016, downloaded Oct. 10, 2016.

* cited by examiner

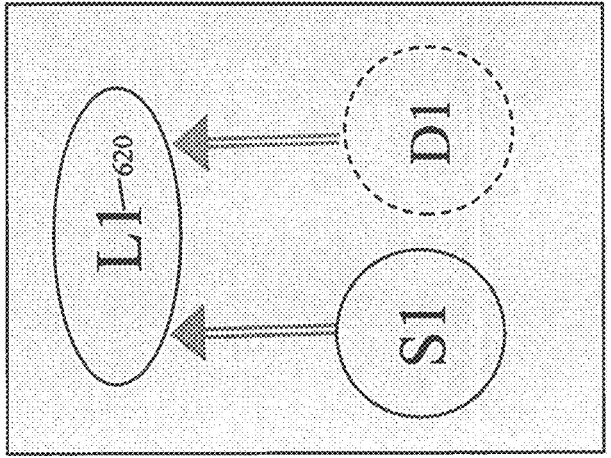
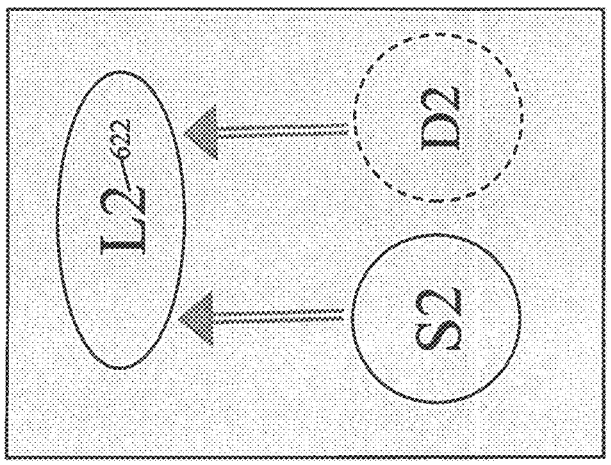
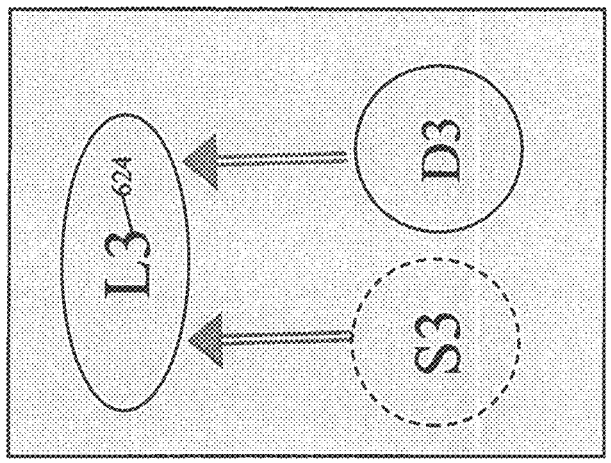
FIG. 10

DISTRIBUTED PLATFORM FOR ROBUST EXECUTION OF SMART HOME APPLICATIONS

CROSS-REFERENCE TO RELATED APPLICATIONS

This application claims priority of U.S. Provisional Patent Application No. 62/400,959, filed Sep. 28, 2016, entitled "Distributed Platform for Robust Execution of Smart Home Applications," which is hereby incorporated by reference.

FIELD OF THE INVENTION

Embodiments of the present invention relate generally to distributed networks. More specifically, various embodiment of the present invention relate to events processing within a distributed network.

BACKGROUND OF THE INVENTION

Connected sensing devices, such as, cameras, microphones, motion door-window, temperature, water, and energy sensors, are increasingly permeating our homes and buildings, with an estimated 50 billion of these such devices in use by 2020. Meanwhile, platforms that host applications for processing data from such devices are rapidly emerging. Examples include Wink™, Vera™, and HomeOS™. These platforms use a low-cost computing device (called a "hub") to communicate with sensing devices and to run applications.

While such platforms provide applications with unified programming abstractions to receive sensed data from devices and trigger actuators (such as thermostats, light switches, and sirens), they do not provide applications with any means to tolerate faults that regularly occur in homes and buildings, such as hub and driver crashes, home network failures, router failures, network partitions, and sensor failures.

Consequently, developing robust applications for sensing devices today is difficult; developers must implement their own failure detection and recovery mechanisms. Hence, a robust platform for delivery of server data and execution of applications is needed.

SUMMARY OF THE INVENTION

A method delivers an event. First, an event is received at a computing device from a sensor, the computing device being one of a number of computing devices in a logical topology of a distributed network. It is determined whether a gap, gapless, or gapless-state delivery protocol is required. The event is then delivered to a computing device based on the delivery guarantee. The event delivery then causes processing of the event and produces an output in the distributed network.

A non-transitory processor-readable medium includes a program that when executed by a processor performs a method that includes the following steps. The method first receives an event at a computing device from a sensor, the computing device being one of a number of computing devices in a logical topology of a distributed network. Next, the device determines to use a gap, gapless, or gapless-state delivery protocol. Then, the event is delivered to one of the computing devices using the determined delivery protocol, thus causing processing of the event at the application and producing an output in the distributed network.

An apparatus delivers an event to an application and includes a computing device configured to receive an event from a sensor, the computing device being one of a number of computing devices in a logical topology of a distributed network. The computing device is also configured to determine to use a gap, gapless, or gapless-state delivery protocols, and to deliver the event to one of the computing devices using the determined delivery protocol. This delivery causes processing of the event at the application and produces an output in the distributed network.

This summary is provided merely to produce certain concepts and not to identify any key or essential features of the claimed subject matter. Many of the features and embodiments of the invention will be apparent from the company drawings and from the following detailed description.

BRIEF DESCRIPTION OF THE DRAWINGS

Accompanying drawings show one or more embodiments; however, the accompanying drawings should not be taken to limit the invention to only the embodiments shown. Various aspects and advantages will become apparent upon review of the following detailed description and upon reference to the drawings in which:

FIG. 10 illustrates an example of runtime management within the platform;

DETAILED DESCRIPTION OF THE INVENTION

Figure 1:
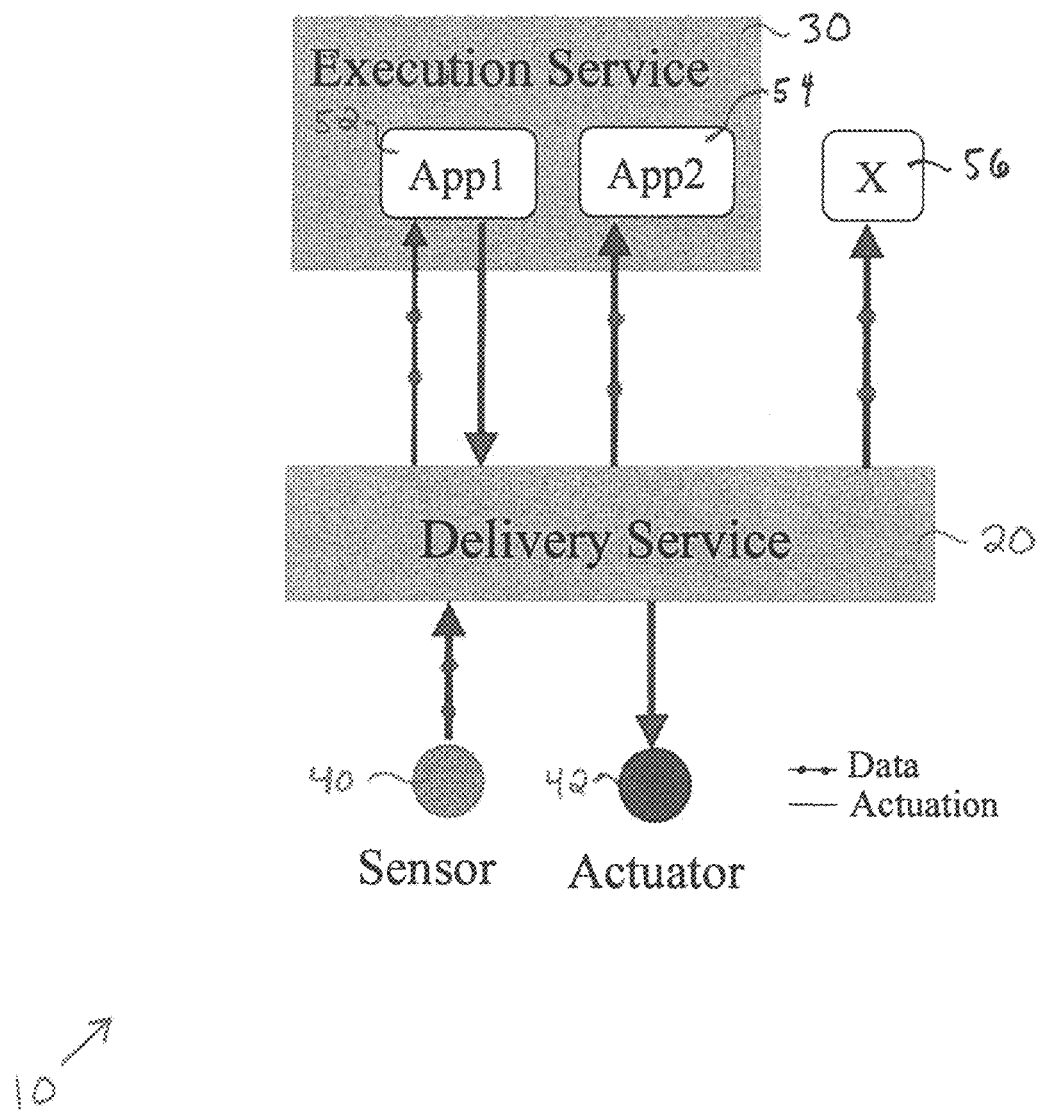
FIG. 1 illustrates one implementation that comprises two logical components: (i) a delivery service, and (ii) an execution service.

One embodiment discloses a platform for robust execution of applications for homes and buildings. The computing platform is, for example, a library of software code (such as distributed middleware) that executes software applications such as IoT applications. The applications are logic nodes of a computing device. Configuration of the applications may also determine the protocols (described below) that are supported or required. We observe that many modern home appliances, such as televisions, refrigerators, and Wi-Fi routers are increasingly being outfitted with low-cost compute devices, in addition to end-user devices such as smartphones and tablets. Therefore, an exemplary platform leverages this natural redundancy to execute applications using only computation capabilities of home appliances, home hubs, tablets and smartphones, while tolerating link losses between compute devices and sensor devices, compute device crashes, and network partitions. By not relying on cloud-based computation and data storage, in one embodiment, the platform provides a novel execution environment for in-home applications, where the platform is able to provide a smooth user experience, and seamless application execution, even in the presence of failures.

Existing home platforms do exist but can be less useful. Some are not fault tolerant, i.e., they lack capabilities to tolerate link losses, compute device crashes, network partitions, etc. Embodiments of the present invention are able to tolerate these failures, provide a smooth user experience, and seamless application execution, even in the presence of failures. In addition, unlike embodiments of the present invention, conventional platforms do not incorporate seamless device connectivity and runtime-management across home appliances, home hubs, smartphones and tablets.

Existing technologies do not address the problems mentioned above. Additionally, they do not provide a unified programming framework for building applications across home appliances, home hubs, smartphones, and tablets. Various embodiments of the present invention leverage the redundant computing capabilities of home appliances to provide applications with a cost-effective fault-tolerant execution platform.

System Overview and Architecture

Our platform is a distributed application framework that runs on users' compute devices (e.g., home hubs, smartphones, tablets, or desktop computers), and ensures reliable execution of IoT applications.

In one embodiment, each compute device runs a single instance of a server which interfaces with sensors/actuators, and hosts applications. Each compute device is connected with a network comprising other compute devices, and is able to communicate with other compute devices. Ordinary people skilled in the art will appreciate that IP based protocols such as TCP/IP can be used for communication between compute devices. Similarly, communication between sensors/actuators and compute devices can use one of multiple protocols such as Ethernet, Wi-Fi, Bluetooth, TCP/IP, Z-Wave, Zigbee™, etc.

In one embodiment, applications are built as a directed acyclic graph (DAG) structure including nodes. Each DAG node may comprise computational state. In one exemplary DAG, the root nodes represent sensors, intermediary nodes encapsulate application-specific logic, and the leaf nodes represent actuators. For instance, to build an application that (i) turns on a light (called LightActuator01) whenever a door sensor (called DoorSensor01) emits a door-open event, and (ii) turns the light off whenever the door sensor emits a door-close event, a logical DAG can be constructed as:

DoorSensor01⇒TurnLightOnOff⇒LightActuator01.

The DoorSensor01 node encapsulates the logic of receiving data values (called events) from the physical sensor, LightActuator01 encapsulates the transmission of actuation commands to the light switch, while the TurnLightOnOff node incorporates the logic of checking if the door has been opened (or closed) and turning the light on (or off) accordingly.

A sensor/actuator node is said to be able to communicate directly to a physical sensor/actuator if, the compute device it is hosted on has the required hardware, e.g., a Z-Wave (or Zigbee) radio for Z-Wave (or Zigbee) communication, and the sensor/actuator is within the range of the compute device at initialization time.

For each sensor or actuator node in the application DAG, every compute device creates either an active node or a shadow node. An active sensor (or actuator) node is created if a compute device can directly communicate with a sensor (or actuator). Otherwise, the compute device creates a shadow node.

FIG. 1 illustrates one implementation 10 that comprises two logical components: (i) a delivery service 20, and (ii) an execution service 30. The delivery service is responsible for providing the required level of reliable event ingress for sensors 40 and reliable event egress for actuators 42, as requested by the applications. The execution service is responsible for providing a managed runtime for the applications (denoted as App1 52, App2 54) and ensuring the processing of events, in the presence of failures. In one embodiment, an application (denoted as X 56) can be allowed to be un-managed and only leverage the delivery service, while self-managing its event processing.

Platform Delivery Service

The delivery service addresses the issues caused by imbalanced sensor ingress and sensor discrepancies. With regard to imbalanced sensor ingress, in many deployment scenarios, e.g., homes and offices, values from a given sensing device are only available at a subset of compute devices in the system because values from a given sensing device can only be received at compute devices that support its communication technologies, while being subject to the limitations imposed by the physical topology. Sensor discrepancies also cause issues when emitting events, such as when a burst of events is emitted.

To address these issues of imbalanced sensor ingress and sensor discrepancies, what is needed is a distributed event-delivery service that runs across different compute devices, and forwards the events from a compute device in-range with the sensor to the compute device(s) running the desired application(s). Certain low-power communication technologies such as Zigbee™ have proposed mesh-based networking across sensors/actuators to solve the problem of varying physical topologies. This solution, however, requires a large number of sensors/actuators (i.e., spatial density) to enable each sensor/actuator to be in-range of each compute device. Every deployment scenario may not have such large number of sensors/actuators in the required proximity Lastly, repeater devices may be seen as a way to circumvent this problem. Repeating, however every signal leads to at least 50% bandwidth and energy wastage, and increased deployment cost. Further, an event delivery service must handle such discrepancies in events generated by a sensor when delivering them to an application for processing. An event can be time stamped upon delivery at a compute device, but in that case, an event delivered at two compute device may be assigned different timestamps. The delivery service should thus handle such inconsistencies, handle duplicate events, and provide a consistent and ordered event stream.

Figure 2:
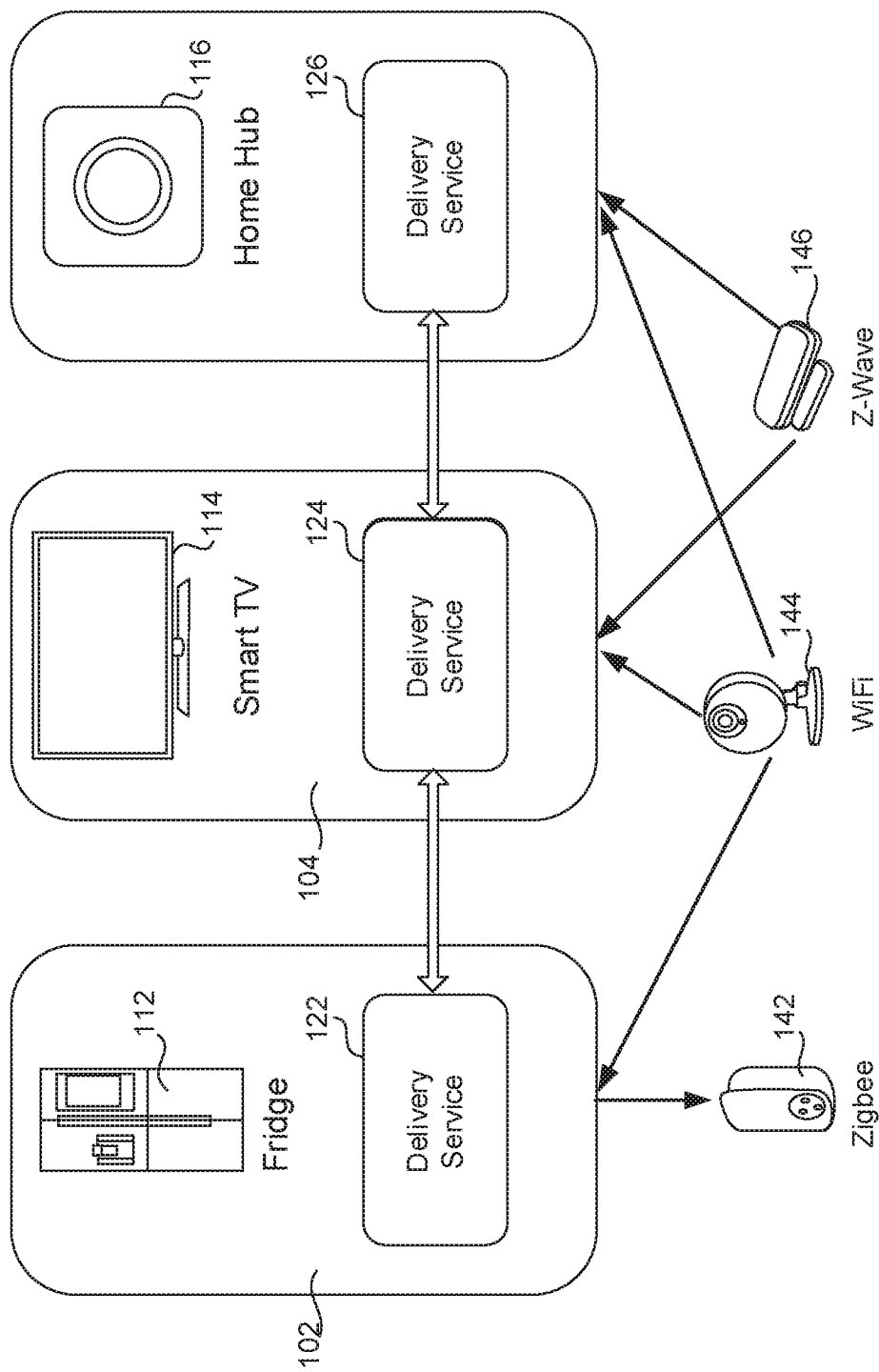
FIG. 2 illustrates generally a distributed fault-tolerant delivery service.

FIG. 2 illustrates a distributed fault-tolerant delivery service. Shown are any number of host computing devices 102-106 that are embodied within a variety of appliances, hubs, routers, telephones, etc., such as refrigerator 112, television 114 and hub 116. A delivery service 122-126 executes upon each of these host computing devices. Connected to these host computing devices as described herein (i.e., wirelessly or wired) are any number of sensors or actuators. For example, shown is a siren alarm actuator 142, a sensor camera 144 and a door sensor 146. The sensors may be able to communicate with all of the hosts or with only a limited number. Similarly, the actuator 142 may only be actuated by host 102 in this example, although in other embodiments each host may be capable of controlling a particular actuator.

Figure 3:
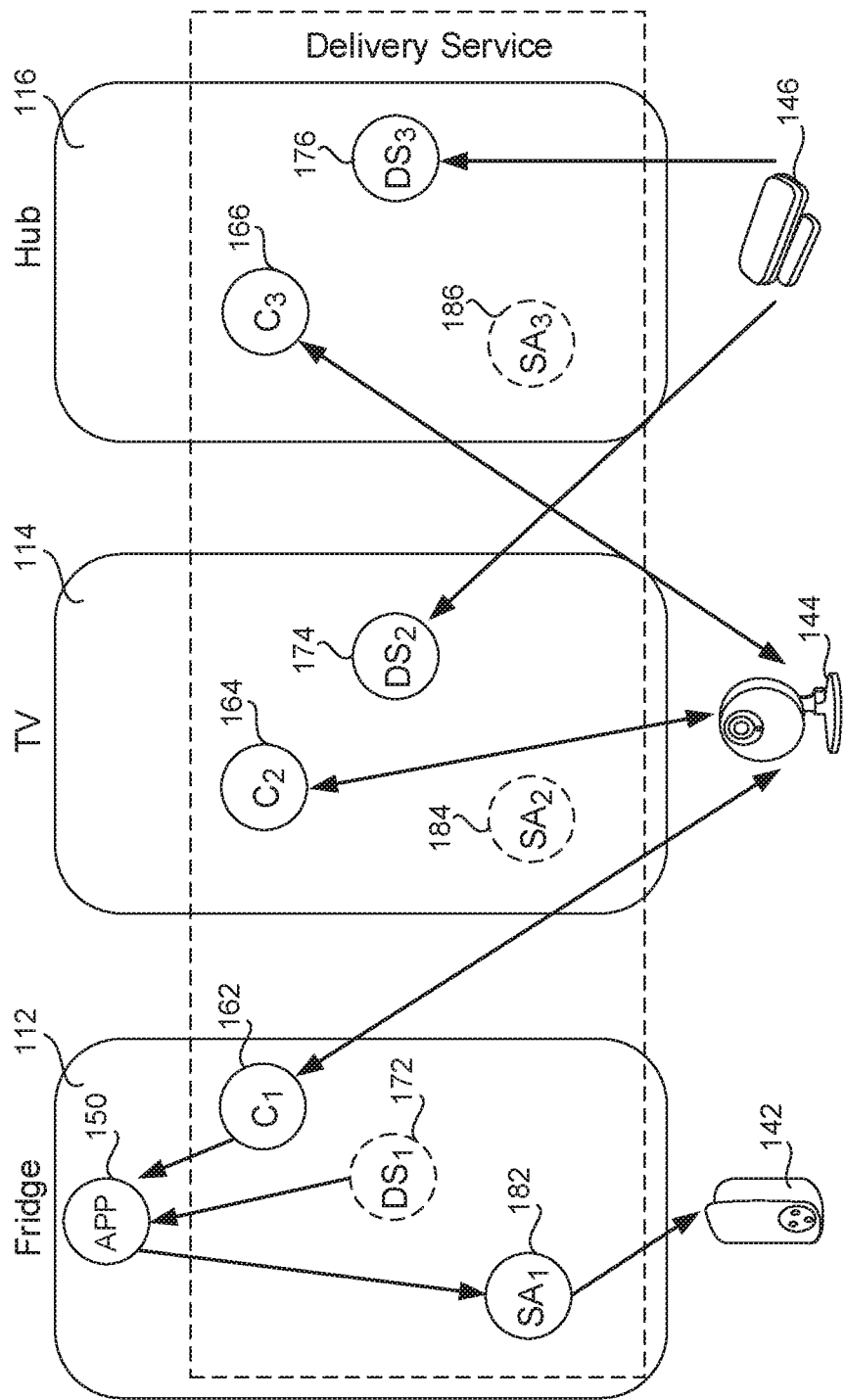
FIG. 3 illustrates a distributed fault-tolerant delivery service in greater detail.

FIG. 3 illustrates a distributed fault-tolerant delivery service in greater detail. In this example, an application 150 is executing upon host 112, and the hosts 112-116 have been organized into a simple chain topology in which host 112 is at the head and is considered the primary host. Each of the hosts 112-116 includes an active-node 162-166 for receiving an event from camera sensor 144, but only hosts 114-116 include a door sensor active-node 174-176 for receiving an event from the door sensor 146. In other words, hosts 114-116 are capable of communicating with door sensor 146 but host 112 is not. Accordingly, a shadow door sensor node 172 is created upon host 112 in order to allow host 112 to receive door sensor events via any of the protocols described below. Similarly, only host 112 is capable of communicating with actuator 142 and thus includes an actuator node 182. Accordingly, hosts 114-116 include a shadow node 184-186 in order to control actuator 142 via any of the protocols described below.

In general, as explained above, an application is written in a directed acyclic graph (DAG) structure. A node in the DAG can be either a sensor node, a logic node or actuator node. Sensor nodes represent the physical sensors, logic nodes contain the logic and an actuator node represents the actual actuation. Also, references to nodes refer to software nodes. That is, sensor/actuator/logic nodes are software nodes, which can be either active or shadow.

Platform Delivery Service—Gap Delivery Protocol

With Gap delivery, the delivery service ensures a best-effort delivery of events from sensors to logic nodes, and actuation commands from logic nodes to actuators.

For Gap delivery, in one embodiment, the platform organizes all sensor nodes for a given sensor, one per compute device, into a single logical chain. A sensor node delivers an event that it receives to its co-resident logic node only if this logic node is active. Otherwise, the active sensor node that is closest, in the chain, to the active logic node forwards the event to sensor node co-resident with the active logic node, which then delivers it to the active logic node. Other active sensor nodes that may have received the event simply discard it.

In one embodiment, the chain's length is chosen based on the desired fault tolerance level, i.e., a chain of length n for tolerating (n−1) failures. The ordering of nodes in a chain is chosen based on the computational resources and the number of sensor/actuator nodes available.

In general, an application programmer decides the desired fault tolerance level. Table 1 illustrates the delivery type requirements of an example set of applications in this setup. An application's default protocol may also depend on the semantics of the application. For example, an intrusion detection application that requires receiving all the events, must choose the Gapless protocol. In case of the Gap protocol, the closest node is determined based on the computational power (that is, if a hub has more computational power, the hub will become the closest node to a refrigerator, instead of a television, for the specific sensor software node).

In case of sensors which can multicast their events, exemplary gap delivery only forwards the values received at the active sensor node that is nearest to the active logic node in the chain. The advantage is that it does not require any event-forwarding and bookkeeping at the other nodes, freeing their computational resources for running other applications. Intermittent failures, however, of a physical sensor-host link may cause events not to be delivered at that particular sensor node, e.g., due to radio interference in case of Zigbee™ and Z-Wave sensors. Many applications can tolerate such gaps in the delivery. For those critical applications that require stronger guarantees, an exemplary platform provides delivery guarantees as described below.

Figure 4:
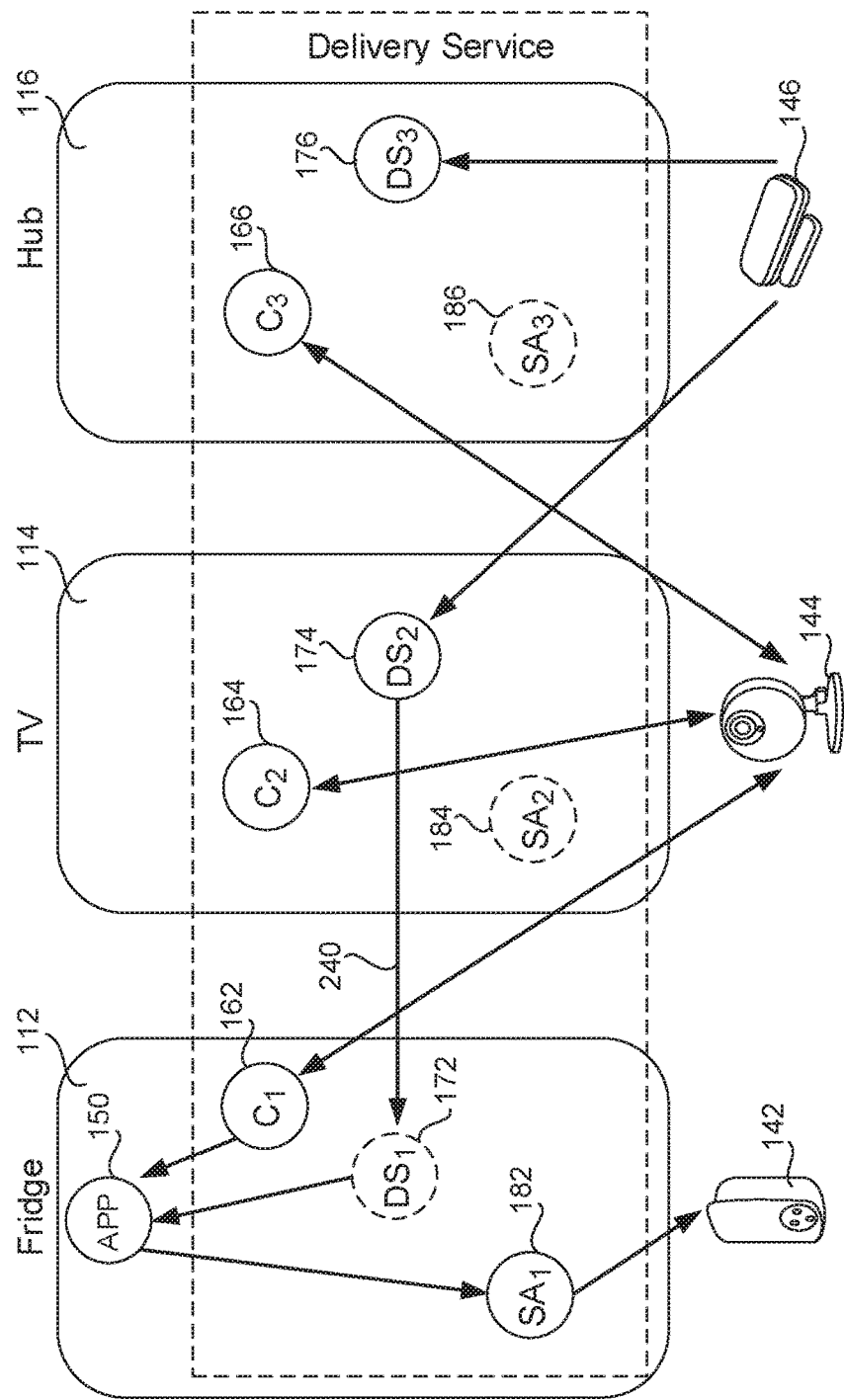
FIG. 4 illustrates in greater detail an example of the gap delivery protocol.

Delivery of actuation commands from the active logic node to the DAG node for the actuator (which then forwards it to the physical actuator), is performed in a manner similar to that for the delivery of sensor events. FIG. 4 illustrates in greater detail an example of the gap delivery protocol. FIG. 4 is similar to FIG. 3 in that it shows a number of host computing devices 112-116 arranged in a chain topology with device 112 being the primary device at the head. In this example, door sensor 146 creates an event (e.g., the door is opened) which can only be received by hosts 114 and 116; host 112, even though it is hosting the application 150 that should receive the door sensor event, is not capable of communicating with sensor 146. Nevertheless, using the gap protocol, when node 174 receives the event, it will forward that event to host 112 via shadow door sensor node 172 such that the event may be processed by application 150. The event is forwarded by host 114 and not by host 116 because host 114 is the closest host that is capable of receiving the event.

Figure 5:
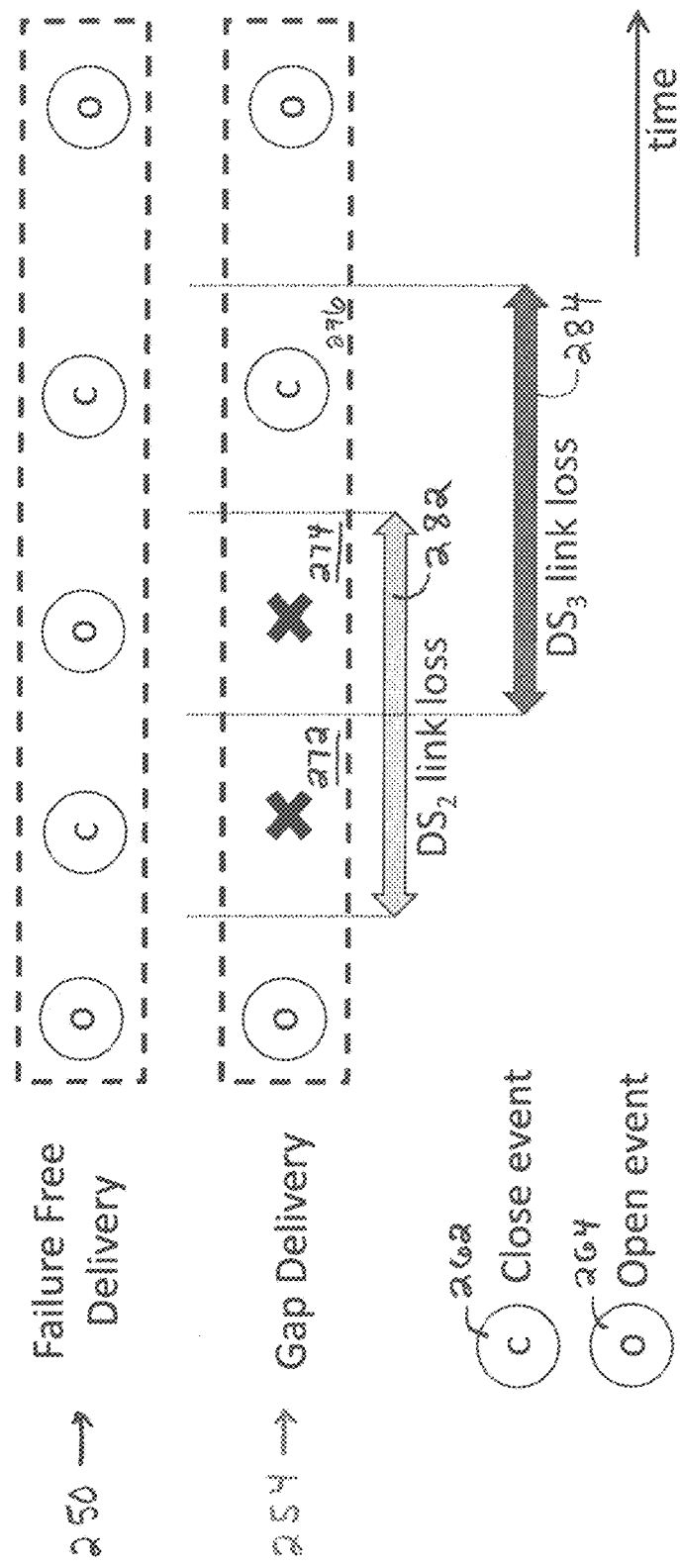
FIG. 5 illustrates a gap protocol example.

FIG. 5 illustrates a gap protocol example. This example shows a theoretical failure free delivery 250 of events from a door sensor to an application on host 112 as well as a gap protocol delivery 254 to an application on host 112. This example shows door closing events 262 as well as door opening events 264. If there is a link loss 282 between node 174 and a sensor 146, event 272 will not be delivered even though it is also received at node 176. This is because node 174 is the node closest to the application (active logic node) that is capable of receiving the event, but, because the link has been lost, node 174 has no event to send. At this time, node 176 does have the event, but because it is not the closest node capable of receiving the event it will not forward that event. Similarly, event 274 is likewise not delivered to the application because not only is there a link lost 282, but also a link lost 284 between node 176 and sensor 146. Neither node 174 or 176 has an event to send. But, event 276 will be forwarded to application 150 even though a link has been lost between node 176 and sensor 146. This is because at this time the link between node 174 and 146 does exist and thus node 174 (being the closest node) is able to forward that event to the application.

A variety of applications may use the gap protocol. When using this protocol, as described above, even though the sensor event stream may have gaps in them in case of a sensor-host link failure, it is still desirable for building many applications. This is because in many cases, such short lived gaps do not have any critical implications on the user or the environment. Such a gap can often be tolerated by the application without causing un-safe behavior. For instance, an application using a stream of occupancy sensors to determine the temperature set point of a thermostat, can use a pre-determined fall back policy, e.g., a set point of 23° C., or the last computed set point value. Similarly, applications that infer home occupancy, e.g., to automate home lighting—SmartLight, can tolerate short-lived gaps in the occupancy sensor event stream by leveraging other sensors such as, door-open sensors, microphones, or cameras, for infer-ring occupancy. Table 1 below lists examples of applications for which a Gap delivery is useful.

TABLE 1

| Application | Primary Function | Sensor | Type | Delivery Type |
|---|---|---|---|---|
| Occupancy-based HVAC | Set the thermostat set-point based on the occupancy | Occupancy sensor | Efficiency | Gap |
| User-based HVAC | Set the thermostat set-point based on the user's clothing level | Camera | Efficiency | Gap |
| Automated lighting | Turn on lights if user is present, e.g., SmartLights | Occupancy sensor, camera, microphone | Convenience | Gap |
| Appliance alert | Alert user if appliance is left on while home is unoccupied | Appliance-level sensor, whole-house meter | Efficiency | Gap |
| Activity tracking | Periodically infer physical activity using 4-second microphone frames | Microphone | Convenience | Gap |
| Fall alert | Issue alert on a fall-detected event | Wearable sensors | Elder care | Gapless |
| Inactive alert | Issue alert if motion/activity not detected | Motion, door sensor | Elder care | Gapless |
| Flood/fire alert | Issue alert on a water (or fire) detected event | Water (or fire) sensor | Safety | Gapless |
| Intrusion-detection | Record image/issue alert on a door/window-open event | Door-window sensor | Safety | Gapless |
| Energy billing | Update energy cost on a power-consumption event | Power sensor | Billing | Gapless |
| Temperature-based HVAC | Actuate heating/cooling if temperature crosses a threshold | Temperature sensor | Efficient | Gapless, Gapless-state |
| Air (or light) monitoring | Issue alert if CO2/CO level surpasses a threshold | CO, CO2 sensors | Safety | Gapless, Gapless-state |
| Surveillance | Record image if it has an unknown object | Camera | Safety | Gapless, Gapless-state |

Platform Delivery Service—Gapless Delivery Protocol Overview

Even though gap delivery is useful for constructing many applications, it falls short for other applications. For many sensors, an event conveys a specific physical observation to an application, and failing to deliver (and compute upon) that event can lead to no subsequent generation of similar events even if the physical phenomenon continues to occur. For instance, Panic-Button and iFall™ are elder care applications which handle events from a wearable sensor of an elder and notifies caregivers if a fall is detected. Other applications handle events from water and fire sensors to notify homeowners. Intrusion-detection applications handle door-open events by taking a picture of the person entering and issue alerts. In these cases, a gap in the event stream is undesirable because no subsequent events may be generated (due to a fallen user, submerged or burnt sensors), and can lead to incorrect application behaviour (missed notifications/alerts).

In addition, Slip&Fall and Daily Routine are SmartThings applications that use motion, door, and cabinet sensor events to detect if an elder did not return from the bathroom after a specified period of time or if she is not active by a specified time, in which case it notifies a caregiver. In this case, gaps in the event stream may lead the application to issue false notifications to the caregivers. And, certain applications, gaps in the event stream can lead to incorrect output to the user, and the application has little means to correct it. For example, EnergyDataAnalytics is an application that uses a whole-house power sensor to calculate the total energy cost, taking into account the pricing scheme (e.g., a time-of-day based scheme) and verifies a user's utility bill. In this case, missing events can lead to the reported cost being incorrect. Therefore, in such scenarios, the delivery protocol should be resilient to event losses caused due to sensor-host link failures, and should attempt to forward the event if the sensor was able to successfully transmit it to at any of the other nodes.

Also, there can be skew due to both radio interference and obstructions (e.g., walls, objects) commonly occurring in homes. Moreover, this problem will be further exacerbated in case of wearable sensors because due to user mobility, a sensor may be in the vicinity of different nodes at different times. The missed motion sensor events may lead to false notifications in case of the Slip&Fall and Daily Routine applications, while the missed door sensor events may lead to missing intrusion notifications. Other applications discussed above may similarly be adversely affected due to such event gaps. Therefore, an enhanced version of the gap protocol, the gapless protocol, which addresses this problem, is needed. Table 2 above lists different applications for which a gapless protocol is desirable.

Figure 6:
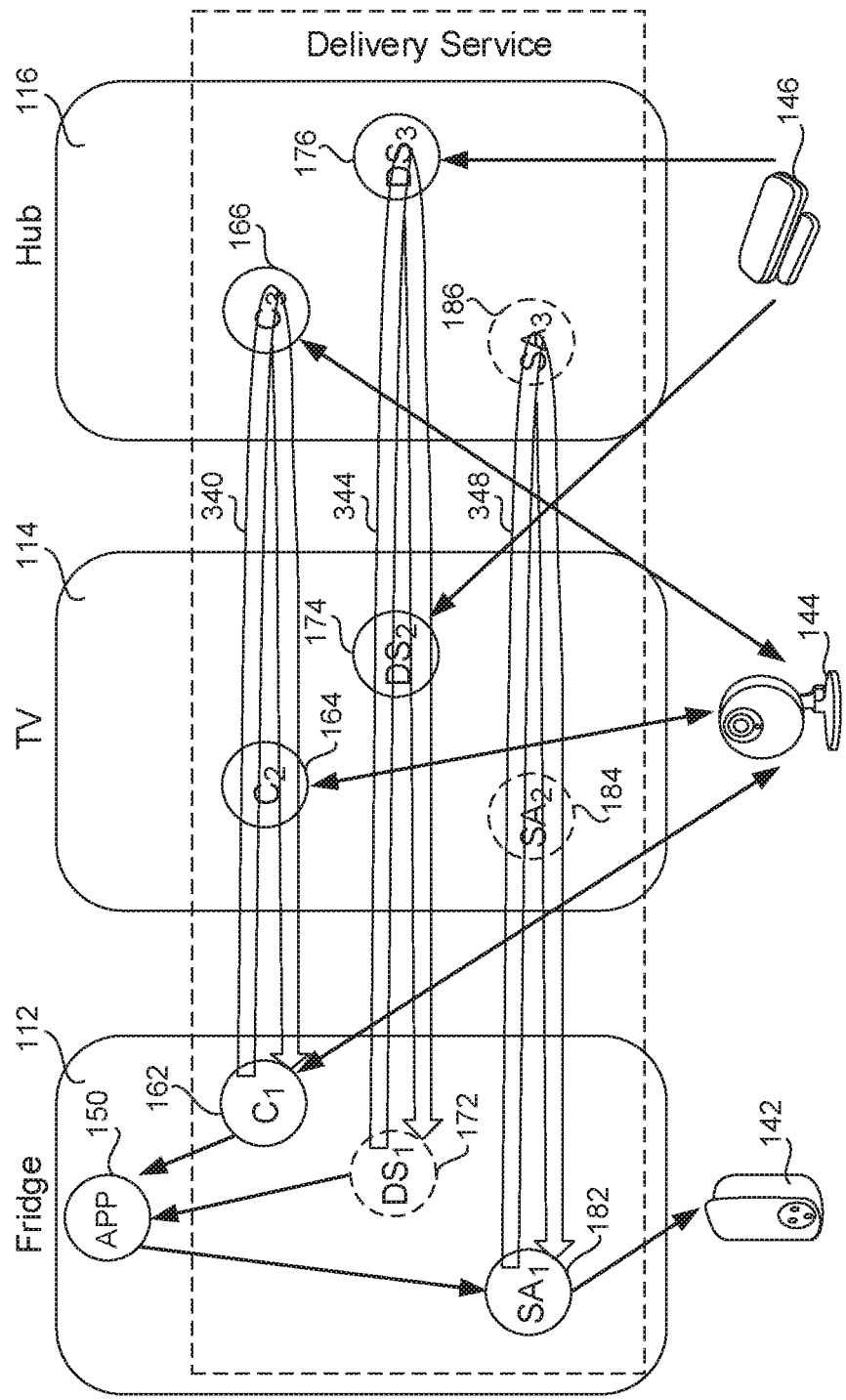
FIG. 6 illustrates in greater detail an example of the gapless delivery protocol.

FIG. 6 illustrates in greater detail an example of the gapless delivery protocol. FIG. 6 is similar to FIG. 3 in that it shows a number of host computing devices 112-116, except that in this example, the nodes are arranged in a ring topology. In this example, door sensor 146 creates an event (e.g., the door is opened) which can only be received by hosts 114 and 116, through active nodes 174-176; host 112, even though it is hosting the application 150 that should receive the door sensor event, is not capable of communicating with sensor 146. Nevertheless, using the gapless protocol, when node 174 receives the event, it will forward that event to all hosts in the ring via link 344. Node 176 will also forward that event as is described in greater detail below. An event sent by the camera sensor 144 and received at camera node 162, for example, will likewise be forwarded around the ring via link 340. Similarly, when application 150 needs to send a command to actuator 142, any command received at node 182, for example, will also be sent around the ring via link 348. In a situation where there is no link between node 182 and actuator 142, but there is a link between node 184 and actuator 142, the command would then be sent via node 184.

Figure 7:
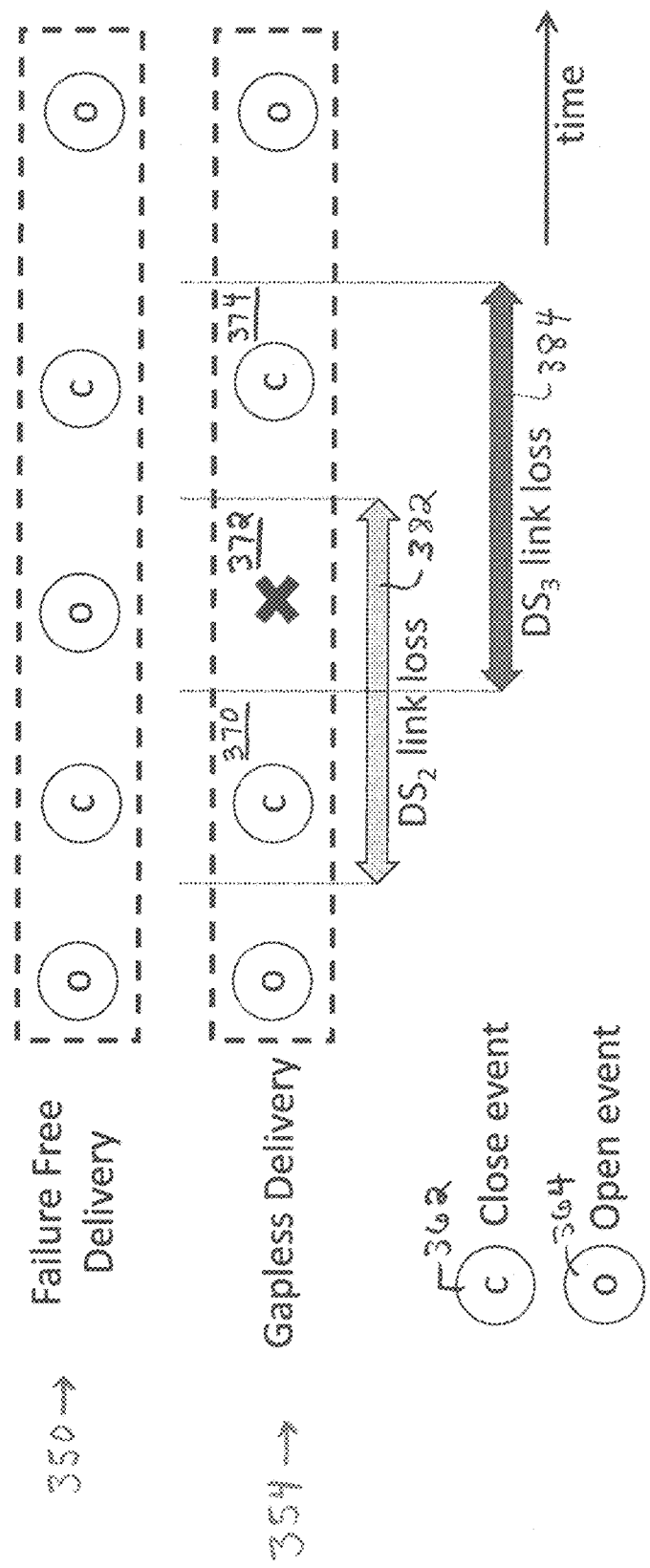
FIG. 7 illustrates a gapless protocol example.

FIG. 7 illustrates a gapless protocol example. This example shows a theoretical failure free delivery 350, of events from a door sensor to an application on host 112 as well as a gapless protocol delivery 354 to an application on host 112. This example shows door closing events 362 as well as door opening events 364. If a link is lost 382 between node 174 and a sensor 146 then event 370 will still be delivered because that event is received at node 176 and it will be delivered to all hosts of the ring topology. But, if both links are lost 382 and 384, then event 372 will not be delivered because no host in the network has received the event. But, at a later time, when only link 384 is lost, then event 374 will be forwarded to application 150 because the event will still be received at node 174 and will be forwarded around the ring topology.

Platform Delivery Service—Gapless State Delivery Protocol Overview

Events generated by many sensing devices contain periodic measurements of physical phenomena sensed by the device, e.g., temperature, humidity, and light intensity. Many applications are interested in receiving an event only if the event signifies a change (or a change outside of a range) in the value of the physical phenomenon, and are not interested in receiving successive events containing identical measurement values. Therefore, in this case the platform delivers event values to applications only to ensure that the application receives all state changes in a physical phenomenon. That is, an event e is safely dropped (and not forwarded along the ring), if the preceding event delivered to the application contained the same value (or a value within a range) as that of e. Table 1 above shows example of applications that perform best with gapless-state delivery guarantee. For example, assume that a temperature sensor emits a temperature value every second as follows: 75, 75, 76, 77, 77, 76, 76, 79, and assume that there is no sensor-host link failure, and therefore, these events are delivered to all compute devices that are capable of communicating with the sensor. In case a programmer asks for gapless delivery, all the above values will be delivered to the active logic node. However, in case a programmer chooses the gapless-state delivery, then the active logic node will receive 75, 76, 77, 76, 79. In addition, a programmer can also specify a threshold for gapless-state. For instance, a programmer can specify gapless-state for the temperature sensor with 2 degree threshold. In this case, the active logic node will receive 75, 77, 79.

Platform Delivery Service—Channel Abstraction

A Channel is a programming abstraction, which is used by applications to both specify their desired delivery guarantee, and is responsible for delivering events to applications (and to actuator nodes). Applications encapsulate their logic into one or more nodes. Shadow-nodes provide applications with a complete uniform view of all the sensor and actuators, regardless of which nodes can communication directly with the sensors/actuators. Applications then request to connect their application nodes to the sensor and actuator, and specify the type of delivery they require, as follows.

```
{
AppNode n = new AppNode("simpleNode");
SensorNode s = Rivulet.getSensor("door");
ActuatorNode a = Rivulet.getSensor("light");
channelFromSensor = n.addUpstreamNode(s, DeliveryType.Gapless);
channelToActuator = a.addUpstreamNode(n, DeliveryType.Gapless);
}
```

The platform then instantiates a distributed channel object on all hosts. The distributed channel object encapsulates and runs the requested delivery protocol, and delivers events asynchronously to the active logic node through a callback.

```
void handleEvent(Event e, Channel ch)
{
//process event e
    if(e.isOpen( ))
    {
        //turn light on
        channelToActuator.put(new Event(Light.On));
    }
}
```

Active logic nodes can de-multiplex the value based on the channel's identifier, in case they have multiple upstream nodes. After handling the event, they may transmit an event to an actuator using the distributed channel that was created to connect them to it. An exemplary programming model hides the complexities of the sensors' communication heterogeneity, physical topology, handling sensor discrepancies, and handling hub failures and network partitions from the application. Application developers program against a global view of ordered event streams from all sensors in the environment, for a variety of available delivery types.

Platform Delivery Service—Poll-Based Sensors

The gap and gapless protocols presented focus on event-driven sensors such as door-open sensors and motion sensors. We can extend the delivery service's design to poll-based sensors, i.e., sensors that generate events only in response to requests by hosts, e.g., temperature and humidity sensors. We assume epoch length is such that an application requires one event per epoch, e.g., one temperature event every 10 seconds.

Regarding gap delivery, it is straightforward to extend our gap protocol so that it also supports poll-based sensors. To this end, we need that the active sensor node closest to an active logic node in the chain, to periodically poll the sensor. All other active sensor nodes do not poll the sensor. Therefore, in case of a failure of the host that is responsible for polling, polling will resume after the next active sensor node in line removes the failed sensor node from its chain, and consequently becomes closest to the active logic node.

Regarding gapless delivery, the simplest way to provide gapless delivery for poll-based sensors is to allow all active sensor nodes to periodically poll the physical sensor for every epoch without any coordination among themselves. This approach, however, may lead to over-polling the sensor, and polling for more events than required by an application. Over-polling a sensor causes increased battery drain of the sensor. We have observed that many off-the-shelf ZWave sensors only support one outstanding poll request, and simply drop the other requests. Consequently, the above uncoordinated approach can also increase the number of failed poll requests in cases where sensors do not handle concurrent requests.

To address these issues, the platform employs a simple coordinated mechanism. Upon initialization, active sensor nodes select their polling schedules such that no concurrent requests are issued to the sensor. We note that sensor nodes do not need to communicate with each other to select their polling schedules. For example, sensor node i can start polling at time $(i*e)/n$ of every epoch where n is the number of active sensor nodes, and e is the epoch duration. This is possible because applications' epoch lengths are typically significantly larger than the time taken to poll a sensor, e.g., 10 seconds epochs as compared to a 500 ms polling period in case of a ZWave temperature sensor. Active sensor nodes then proceed to poll the physical sensor, and forward the received event along the gapless delivery ring. If an active sensor node receives an event for the current epoch along the ring, it cancels its scheduled poll for that epoch. Therefore, in the failure free case and as long as the time it takes to propagate an event around the ring is smaller than the epoch duration, a sensor is only polled once per epoch.

Platform Delivery Service—Flow Diagrams

Figure 8:
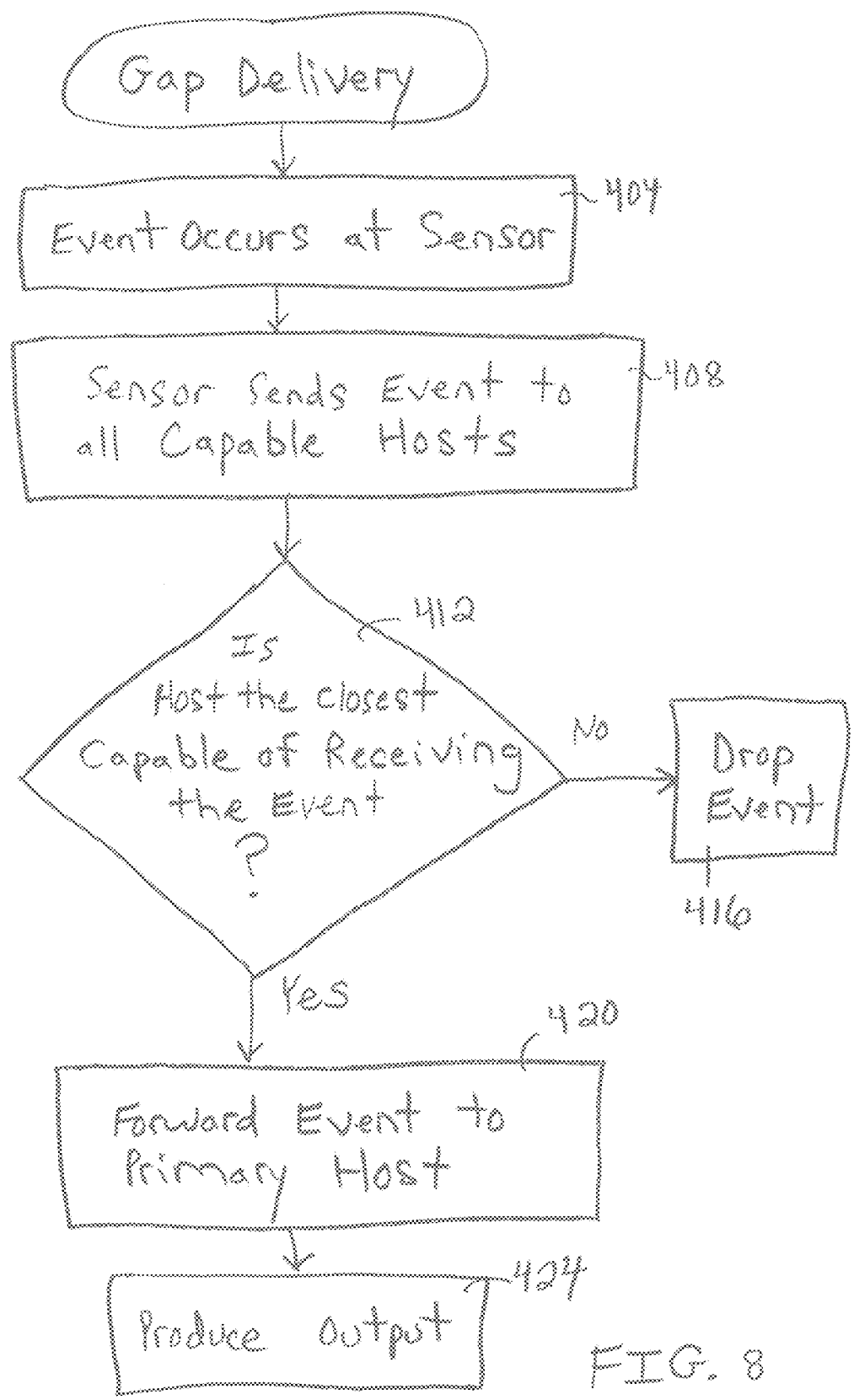
FIG. 8 is a flow diagram describing the embodiment in which a sensor uses the gap delivery protocol.

FIG. 8 is a flow diagram describing the embodiment in which a sensor uses the gap delivery protocol. For every application, the delivery protocol, gap or gap-less, has been pre-determined. Such a per-determination can be a system default, designated by a controlling entity or as an application parameter. In other words, a determination of whether to use which protocol is made on a sensor-by-sensor basis. In step 404, an event occurs at a sensor such as at a door sensor, a camera, a thermometer, a smoke detector, or a motion detector.

The event may be any of a variety of occurrences, values, readings, images, etc. that occur at the sensor such as the opening or closing of the door, and image captured by the camera, motion detected by a motion sensor, a temperature reading, a smoke reading, or motion reading.

In step 408 the sensor sends the event to all computing devices within the distributed network capable of receiving the event. For example, as shown in FIG. 4, an event received by door sensor 146 will be sent to hosts 114 and 116 because they are capable of communicating with the door sensor, but not to host 112 because it is not able to communicate. Because each host receiving the event is aware of which protocol should be implemented for the sensor sending the event, each host take steps to implement the gap delivery protocol for the received event.

In step 412 each host that receives the event determines whether it is the host closest to the primary host in the logical chain that is capable of receiving the event from the sensor. For example, host 116 will determine that it is not the closest host because host 114 is actually the closest host to the primary host 112. Therefore, in step 416 host 116 drops event and does not send it. But, host 114 does determine that it is the closest host to the primary host that is capable of receiving the event, and thus, in step 420, it forwards that event to primary host 112. The primary host is the host where the application (active logic node) runs.

In step 424 the event is received at host 112 (e.g., via node 162 and application 150) and the host handles the event according to the programming logic of the application. Depending upon the value of the event and the programming logic, the application may decide to produce an output such as by actuating one of a variety of actuators within the distributed network. A variety of actuators may be included within the network such as alarms, opening and closing devices, video cameras, audio alerts. If desired, the host produces an output at one of the actuators (e.g., sounding an alarm at siren 142) using the protocol suitable for that particular actuator.

Figure 9A:
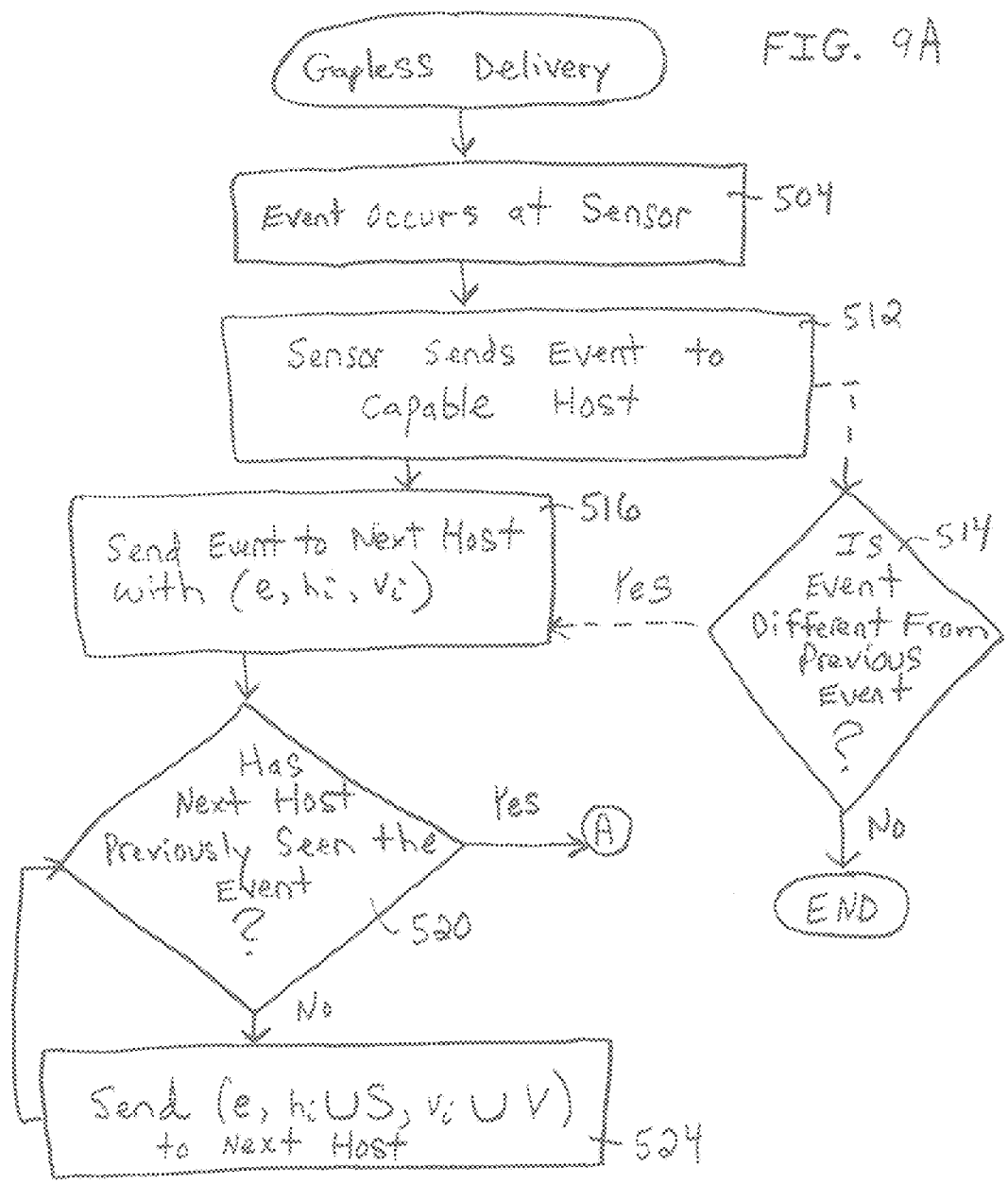
FIGS. 9A and 9B are a flow diagram describing the embodiment in which a sensor uses the gapless or gapless-state delivery protocol.
Figure 9B:
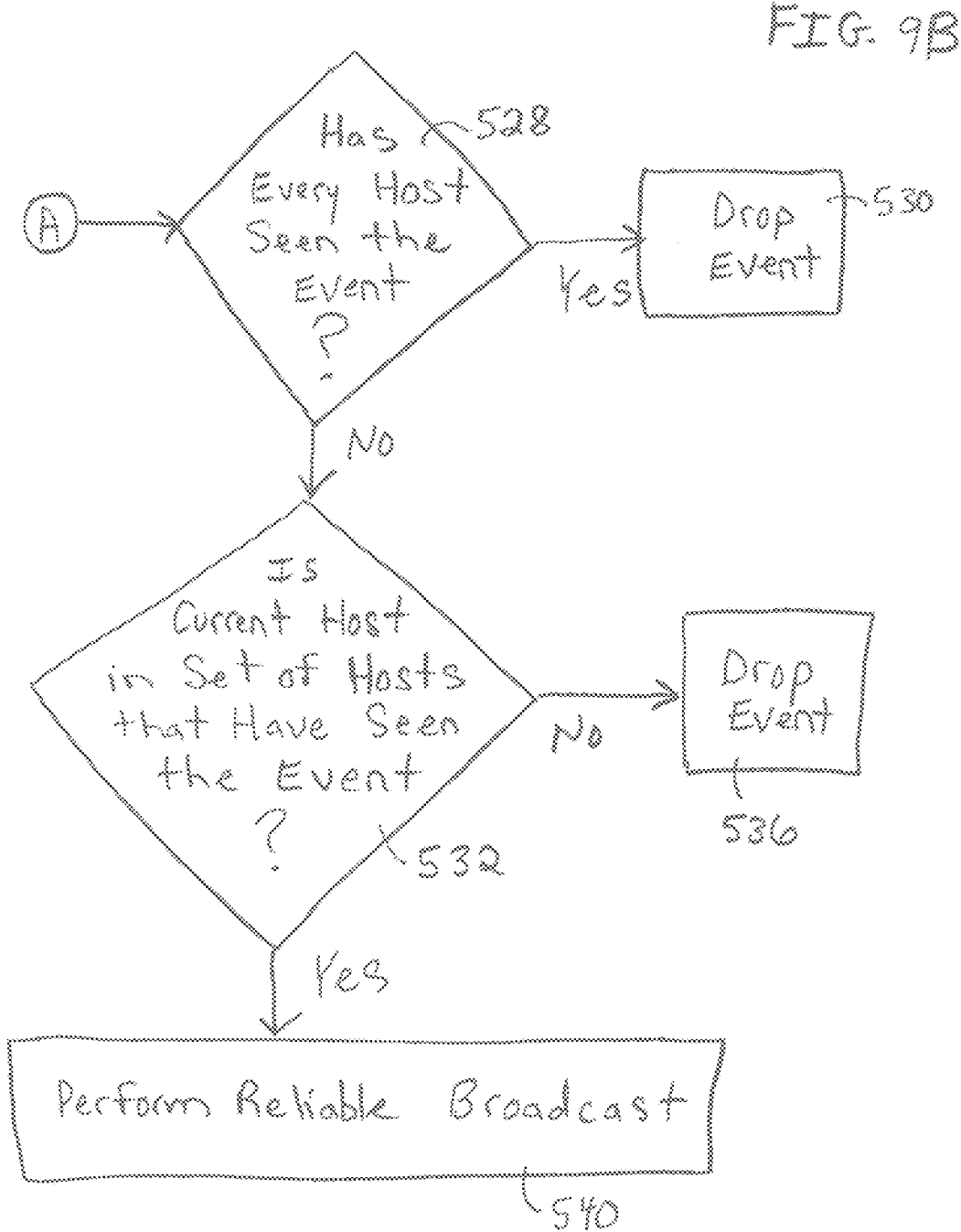

FIGS. 9A-9B is a flow diagram describing the embodiment in which a sensor uses the gapless or the variation gapless-state delivery protocol. Within the distributed network, it has been predetermined by an application programmer or by the user, which sensors use the gap delivery protocol and which sensors may use other protocols. In other words, a determination of whether to use which protocol is made on a sensor-by-sensor basis, and each computing device within the network is aware of which sensors require which protocol. Thus, in this example, a host receiving an event from a sensor is aware of which particular protocol to implement for the event received from that sensor.

In general, the goal of the gapless (or gapless-state) delivery protocol is to ensure that any event received from a sensor node by any host will be received by all available hosts. Therefore, the event will eventually be delivered to an instance of the application (active logic node) running on one of the hosts. This protocol allows the platform to tolerate m−1 sensor-host link losses and n−1 host crashes without losing events.

A host first tries to optimistically propagate a received event using a ring protocol (described below). However, because of host failures and asynchrony, this ring protocol may not succeed. In this case, the host falls back and uses a reliable broadcast protocol to successfully transmit the event to all hosts. Every host $h_i$ maintains a local view set (denoted as $v_i$) that contains hosts that it thinks are up by exchanging keep alive messages every t seconds. The ring-based protocol uses the following message format: (e:S:V) where e denotes the event, S denotes the set of hosts that have seen the event, and V denotes the set of hosts that need to see the event.

In step 504 an event occurs at a (physical) sensor such as at a door sensor, a camera, a thermometer, a portable alert device, etc. The event may be any of a variety of occurrences, values, readings, images, etc. that occur at the sensor such as the opening or closing of the door, and image captured by the camera, motion detected by a motion sensor, a temperature reading, etc. In step 512 the sensor sends the event to a computing device host within the distributed network capable of receiving the event.

If the sensor is using the gapless-state protocol, then in step 514 each host receiving the event determines whether the event is different from the previously received event from that sensor. Typically, Gap/Gapless/Gapless state protocol is defined by the application programmer inside the logic node. When we say that a sensor node uses gapless-state, we mean that a programmer required and requested gapless-state for a given sensor. If so, then control moves to step 516, if not, then the event is dropped and the flow ends. An event may be different if it actually has a different value, or if it is outside of a range of the previous event. For example, if the previous event is 68 degrees, and the new event is 69 degrees, then it may be determined that the event is not different because the range is 2 degrees, plus or minus. Thus, an event of 66 degrees would be determined to be different. The point is that we only need to store the last acted upon value, not all values. In this example, if 68 was the last event we acted upon (i.e., the delivery service delivered it), and if the range is set to 2 degrees, as long as the sensor sends 69, the delivery service can safely ignore it. A programmer or user may pre-determine a range for an event for each sensor.

If the sensor uses the gapless protocol, then control moves from step 512 to step 516. When the active sensor node at host i (called $h_i$) receives the event e from the physical sensor, it sends message $(e:\{h_i\}:v_i)$ to its immediate successor node according to its local view $v_i$. Additionally, if the host also runs an instance of the application, in other words it contains active logic node, it delivers the event to the active logic node. Next, in step 520, upon receiving (e:S:V) from another host, the sensor node at host $h_i$ first checks whether it has previously seen the event or not. If so, control moves to step 528 and two conditions are evaluated. If the event has not been seen, then in step 524 it sends message (e:{$h_i$}∪S:$v_i$∪V) to its immediate successor based on its local view $v_i$. Control then moves to step 520 where the next host evaluates whether it has seen the event.

In steps 528 and 532, the sensor node evaluates two conditions: whether S equals V (step 528), and whether $h_i$ is a member of set S (step 532). If S is not equal to V and $h_i$ is a member of set S, $h_i$ knows that it has previously forwarded the event, but the event has not been delivered to all hosts (as per the local view of some host). Consequently, host $h_i$ initiates a reliable broadcast in step 540 to send the event to all available hosts. Otherwise, the received event is ignored in steps 530 and 536.

Whenever host $h_i$ updates its view and has a new successor, it synchronizes its set of received events with the new successor, and re-sends every event that the new successor has not received. To perform this synchronization efficiently, $h_i$ first queries the new successor for the timestamp of the last event it has received. It then computes the set of events that need to be sent to the new successor. A new successor may be discovered as follows. Initialization provides an identifier to each device (refrigerator, hub, television, etc.), and every device knows all the other devices in the system, but not necessarily how the ring is formed. Each device also has a local view of its successor. When there is a new node, it runs the initialization again to add itself into the system. The device that has the new node as a successor will have an updated local view while the other existing nodes do not change their local views. All, however, will have knowledge of existence of the new node. In another embodiment, every host runs a deterministic function f to pick its successor from among all the hosts that it thinks are up and running. Once it suspects a host has crashed, it removes it from its view set, and therefore, the deterministic function returns another host as its successor.

Rivulet Execution Service

Embodiments of the delivery protocols and mechanisms described above provide event delivery in the presence of sensor-host link losses. At initialization, on each compute device, a set of sensor/actuator nodes are synchronized such that if an active sensor/actuator node does not exist locally, a corresponding shadow-node for it is created.

FIG. 10 illustrates an example of the platform. Shown are compute devices 604-612, each compute device having an application 620-624. The application running in 620 is called active logic node. For any application that is deployed, the runtime system instantiates shadow logic node on other compute devices. Shadow logic nodes do not have any state, and do not perform any computation, until they are promoted to active logic nodes. Sensors 630 and 632 send events to hosts 604, 608 and 612, respectively. The compute device 612 hosts a shadow-node for sensor S (called S3), while the others host shadow-nodes for sensors D (called D1 and D2 respectively). This allows applications to be easily written (and deployed) assuming that all sensor events are available at all compute devices. As described above, each application is then associated with its own logical chain of compute devices. Therefore, different compute devices can act as 604 for different applications, configured either statically or using a scheduler for better load balancing. For example, in FIG. 10, the application has a logical chain involving Device-1, Device-2, and Device-3.

Primary Selection and Failover to Secondary Hosts

The runtime system uses a primary-secondary approach for fault-tolerant execution of applications. To this end, it employs a variant of the bully-based leader election algorithm for selecting the active logic node. Whenever a shadow logic node suspects that all its successors in the chain have crashed, it promotes itself to become active logic node, and notifies all its predecessors in the chain. Similarly, whenever an active logic node detects that its immediate chain successor (if any) has recovered, it demotes itself to a shadow node, and notifies all its predecessors in the chain.

For example, in case of the active-logic node 620 located on Device-1 failing or being partitioned from others, in FIG. 10, its immediate predecessor (i.e., shadow logic node 622) becomes the new active logic node, leaving the remainder of the chain unchanged. The advantage of using this algorithm is that it allows compute devices to arbitrarily leave and re-join the chain. Such scenarios are very likely when compute devices are end-user devices such as televisions, home hubs, smartphones, etc.

In home and building deployment scenarios, user devices are often connected to a single Wi-Fi router, whose failure can lead to all compute devices being partitioned from each other. In this case, all shadow logic nodes will be promoted to active logic nodes, and will attempt to handle any events they directly receive from the sensors.

However, in many scenarios, failures, network partitions, etc. can lead to events of a sensor not being available at a compute device. In such scenarios, and depending on the operations that an application is performing, it may or may not be possible for it to proceed correctly.

For instance, in the example above, the failure or partition of 612 will lead to missing D events at 604 and 608. Similarly, a partition causes missing events from S at 612. In this case, an application computing the average home temperature using values of S and D can proceed albeit with reduced accuracy. An application, however performing measuring the difference in two rooms using S's and D's values will need to stall.

Platform Implementation Example

The platform may be implemented in Java, as a cross-platform service that can be deployed on Linux, Windows, and Android, with around 8 k SLOC. On Android, the platform runs as a user-application using a single background service task. The platform uses the Netty library to manage TCP connections between hosts, along with custom serialization for events and other messages. Similar to HomeOS and Beam, adapters encapsulate communication specific logic. The platform currently implements adapters for ZWave, Zigbee, IP cameras, and smartphone based sensors such as microphone, accelerometer, and GPS (on Android). Adapters deliver received events to local active sensor nodes, and receive actuation commands from local actuator nodes and translate them to technology-specific network frames, depending upon the type of the adapter. At initialization, the platform instantiates the adapters depending upon the communication capabilities of the local host.

The Z-Wave adapter uses our modified version of the OpenZWave. We modified it to enable concurrent receipt of events from multiple sensors, and enable concurrent polling of multiple sensors from a single host. The Zigbee adapter uses the EmberZNet library, whereas the IP camera adapter and the smartphone adapters leverage the RESTinterface and Android Sensor Manager interface respectively.

Finally, the current implementation uses a simple deterministic function to select hosts for deploying active logic nodes. This function seeks to deploy a logic node on a host that has the largest number of active sensors and actuators required by the logic node. This allows the platform to minimize delay incurred during event delivery. Of course, this is only an example implementation and other implementations may be used.

Computer System Embodiment

Figure 11A:
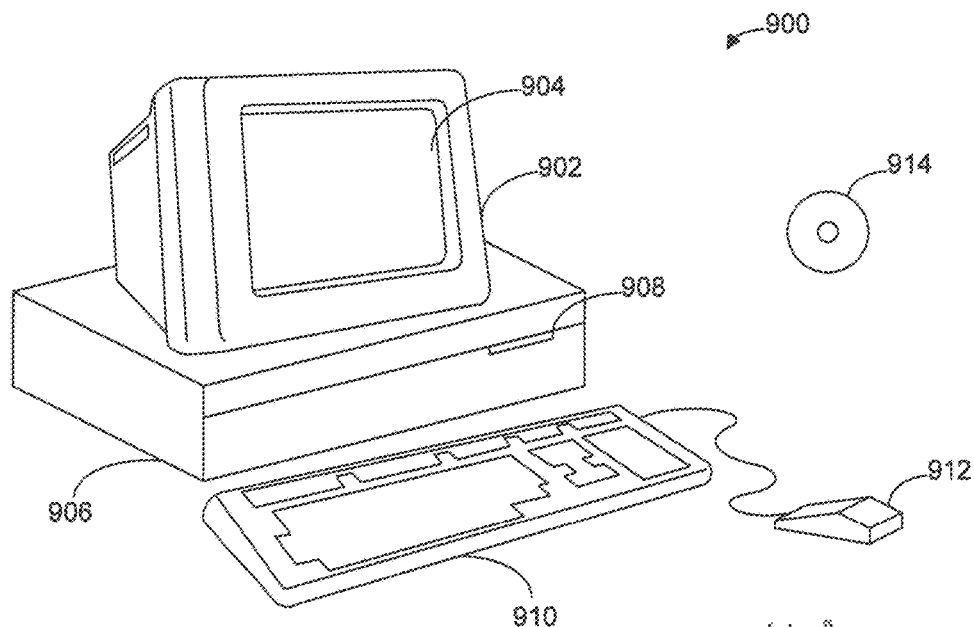
FIGS. 11A and 11B illustrate a computer system suitable for implementing embodiments of the present invention.
Figure 11B:
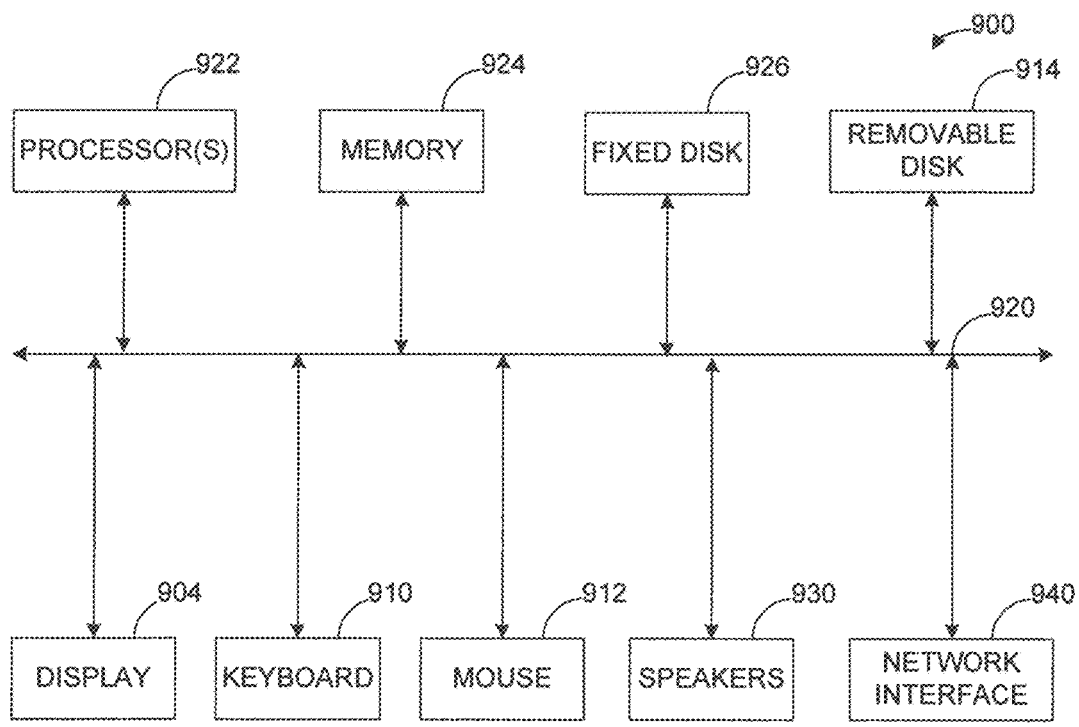

FIGS. 11A and 11B illustrate a computer system 900 suitable for implementing embodiments of the present invention. FIG. 13A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of event delivering, said method comprising:
   receiving an event at a computing device from a sensor, said computing device being one of a plurality of computing devices in a logical topology of a distributed network;
   in response to direct communication capability between said computing device and said sensor, creating, by said computing device, an active node corresponding to the sensor;
   in response to indirect communication capability between said computing device and said sensor, creating, by said computing device, a shadow node corresponding with said sensor;
   determining, by said computing device, a delivery protocol that specifies how the event is delivered to one of the plurality of computing devices over the distributed network,
      wherein said delivery protocol is at least one of a gap delivery protocol, a gapless delivery protocol or a gapless-state delivery protocol;
   delivering, by said computing device, said event from said computing device to said one of said plurality of computing devices using said determined delivery protocol; and
   causing processing of said event at said one of said plurality of computing devices resulting in an output at an actuator in said distributed network.

2. The method as recited in claim 1, wherein said logical topology is a logical chain and wherein said determined delivery protocol is said gap delivery protocol, said method further comprising:
   determining that said computing device is a closest computing device to a primary computing device in said logical chain; and
   in response to determining that said computing device is said closest computing device to said primary computing device, delivering said event from said computing device to an application of said primary computing device.

3. The method as recited in claim 2, wherein said computing device is said closest computing device to said primary computing device capable of receiving said event from said sensor.

4. The method as recited in claim 1, wherein said logical topology is a logical ring and wherein said determined delivery protocol is said gapless delivery protocol, said method further comprising:

sending said event from said computing device to each of said plurality of computing devices using said logical ring topology; and delivering said event to an application executing upon one of said plurality of computing devices.

5. The method as recited in claim 4, further comprising:
stopping the sending of said event to said plurality of computing in response to determining that said event has reached each of said plurality of computing devices.

6. The method as recited in claim 1, wherein said logical topology is a logical ring and wherein said determined delivery protocol is said gapless-state delivery protocol, said method further comprising:
determining that a value of said event is different from a value of a preceding event received from said sensor;
in response to determining that said value of said event is different, sending said event from said computing device to each of said plurality of computing devices using said logical ring topology; and
delivering said event to an application executing upon one of said plurality of computing devices.

7. The method as recited in claim 6, further comprising:
in response to determining that said value of said event is not different, dropping said event.

8. A non-transitory computer readable medium including a plurality of instructions that, when executed by a processor, are configured to cause the processor to:
receive an event at a computing device from a sensor, said computing device being one of a plurality of computing devices in a logical topology of a distributed network;
in response to direct communication capability between said computing device and said sensor, create, by said computing device, an active node corresponding to the sensor;
in response to indirect communication capability between said computing device and said sensor, create, by said computing device a shadow node corresponding with said sensor;
determine, by said computing device a delivery protocol that specifies how the event is delivered to one of the plurality of computing devices over the distributed network,
wherein said delivery protocol is at least one of a gap delivery protocol, a gapless delivery protocol or a gapless-state delivery protocol;
deliver, by said computing device, said event from said computing device to said one of said plurality of computing devices using said determined delivery protocol; and
cause processing of said event at said one of said plurality of computing devices resulting in an output at an actuator in said distributed network.

9. The non-transitory computer readable medium as recited in claim 8, wherein said logical topology is a logical chain and wherein said determined delivery protocol is said gap delivery protocol, said plurality of instructions is further configured to cause the processor to:
determine that said computing device is a closest computing device to a primary computing device in the logical chain; and
in response to the determination that said computing device is said closest computing device to said primary computing device, delivering said event from said computing device to an application of said primary computing device.

10. The non-transitory computer readable medium as recited in claim 9, wherein said computing device is said closest computing device capable of receiving said event from said sensor.

11. The non-transitory computer readable medium as recited in claim 8, wherein said logical topology is a logical ring and wherein said determined delivery protocol is said gapless delivery protocol, said plurality of instructions is further configured to cause the processor to:
send said event from said computing device to each of said plurality of computing devices using said logical ring topology; and
deliver said event to an application executing upon one of said plurality of computing devices.

12. The non-transitory computer readable medium as recited in claim 11, wherein said plurality of instructions is further configured to cause the processor to:
stop the sending of said event to said plurality of computing devices in response to determining that said event has reached each of said plurality of computing devices.

13. The non-transitory computer readable medium as recited in claim 8, wherein said logical topology is a logical ring and wherein said determined delivery protocol is said gapless-state delivery protocol, wherein said plurality of instructions is further configured to cause the processor to:
determine that a value of said event is different from a value of a preceding event received from said sensor;
in response to determining that said value of said event is different, send said event from said computing device to each of said plurality of computing devices using a logical ring topology; and
deliver said event to an application executing upon one of said plurality of computing devices.

14. The non-transitory computer readable medium recited in claim 13, wherein the plurality of instructions is further configured to cause the processor to:
in response to determining that said value of said event is not different, drop said event.

15. An apparatus for delivering an event, said apparatus comprising:
a computing device configured to:
receive said event from a sensor, said computing device being one of a plurality of computing devices in a logical topology of a distributed network,
in response to direct communication capability between said computing device and said sensor, create an active node corresponding with said sensor,
in response to indirect communication capability between said computing device and said sensor, create a shadow node corresponding to said sensor,
determine a delivery protocol that specifies how the event is delivered to one of the plurality of computing devices over the distributed network,
wherein said delivery protocol is at least one of a gap delivery protocol, a gapless delivery protocol of a gapless-state delivery protocol,
deliver said event from said computing device to said one of said plurality of computing devices using said determined delivery protocol, and
cause processing of said event at said one of said plurality of computing devices resulting in an output at an actuator in said distributed network.

16. The apparatus as recited in claim 15, wherein said logical topology is a logical chain and wherein said determined delivery protocol is said gap delivery protocol, said computing device being further configured to:

determine that said computing device is a closest computing device to a primary computing device in said logical chain, and in response to determining that said computing device is said closest computing device to said primary computing device, deliver said event from said computing device to an application of said primary computing device.

17. The apparatus as recited in claim 16 wherein said computing device is said closest computing device capable of receiving said event from said sensor.

18. The apparatus as recited in claim 15 wherein said logical topology is a logical ring and wherein said determined delivery protocol is said gapless delivery protocol, said computing device being further configured to:

send said event from said computing device to each of said plurality of computing devices using said logical ring topology, and deliver said event to an application executing upon one of said plurality of computing devices.

19. The apparatus as recited in claim 18, wherein said computing device being further configured to stop the sending of said event to said plurality of computing devices in response to determining that said event has reached each of said plurality of computing devices.

20. The apparatus as recited in claim 15, wherein said logical topology is a logical ring and wherein said determined delivery protocol is said gapless-state delivery protocol, said computing device being further configured to:

determine that a value of said event is different from a value of a preceding event received from said sensor, and in response to determining that said value of said event is different, send said event from said computing device to each of said plurality of computing devices using said logical ring topology, and deliver said event to an application executing upon one of said plurality of computing devices.

* * * * *